United States Patent
Backman et al.

(10) Patent No.: US 9,569,050 B2
(45) Date of Patent: Feb. 14, 2017

(54) APPARATUS AND/OR METHOD FOR SENSING TOUCH INPUT

(71) Applicant: Nokia Technologies Oy, Espoo (FI)

(72) Inventors: Juha Reinhold Backman, Espoo (FI); Richard White, Huntingdon (GB); Markku Antti Kyosti Rouvala, Helsinki (FI); Stefano Borini, Cambridge (GB); Michael Astley, Waterbeach (GB)

(73) Assignee: Nokie Technologies Oy, Espoo (FI)

( * ) Notice: Subject to any disclaimer, the term of this patent is extended or adjusted under 35 U.S.C. 154(b) by 57 days.

(21) Appl. No.: 14/579,518

(22) Filed: Dec. 22, 2014

(65) Prior Publication Data

US 2015/0185918 A1 Jul. 2, 2015

(30) Foreign Application Priority Data

Jan. 2, 2014 (GB) .................................. 1400013.7

(51) Int. Cl.
*G06F 3/044* (2006.01)
*G06F 3/041* (2006.01)

(52) U.S. Cl.
CPC ............. *G06F 3/044* (2013.01); *G06F 3/0416* (2013.01); *G06F 2203/04111* (2013.01)

(58) Field of Classification Search
CPC ........ G06F 3/041; G06F 3/044; G06F 3/0416; G06F 3/0488; G06F 2203/0411
USPC .................................................. 345/173–179
See application file for complete search history.

(56) References Cited

U.S. PATENT DOCUMENTS

| | | | | |
|---|---|---|---|---|
| 7,948,478 B2 * | 5/2011 | Chuang | ................... | G06F 3/041 178/18.01 |
| 8,587,542 B2 * | 11/2013 | Moore | ................ | G06F 3/04883 345/173 |
| 8,858,003 B2 * | 10/2014 | Porter | ................. | H03K 17/962 362/23.03 |
| 9,042,075 B2 * | 5/2015 | Borini | .................. | G01N 27/121 361/178 |
| 9,147,398 B2 * | 9/2015 | White | .................... | G10L 15/24 |
| 2008/0153182 A1 * | 6/2008 | Herchen | ........... | H01L 21/67173 438/10 |
| 2008/0252613 A1 | 10/2008 | Chuang | | |

(Continued)

FOREIGN PATENT DOCUMENTS

| | | |
|---|---|---|
| CN | 202049130 U | 11/2011 |
| EP | 2642378 A1 | 9/2013 |

(Continued)

OTHER PUBLICATIONS

"QMatrix", Atmel, Retrieved on Jan. 29, 2015, Webpage available at : http://www.atmel.com/products/touchsolutions/bsw/qmatrix.aspx.

(Continued)

*Primary Examiner* — Vijay Shankar
(74) *Attorney, Agent, or Firm* — Harrington & Smith

(57) ABSTRACT

A capacitive sensor electrode for sensing a touch input. A material is configured to temporarily modify a capacitance of the capacitive sensor electrode during a period after a touch input has occurred. After the touch input has occurred, a material change in capacitance of the material is relatively slower than an electrode change in capacitance of the capacitive sensor electrode.

20 Claims, 4 Drawing Sheets

(56) References Cited

U.S. PATENT DOCUMENTS

2012/0217147 A1 8/2012 Porter et al.
2012/0306766 A1 12/2012 Moore
2014/0207467 A1 7/2014 White et al.
2014/0247529 A1 9/2014 Borini et al.

FOREIGN PATENT DOCUMENTS

| JP | 2012-133732 A | 7/2012 |
|---|---|---|
| WO | 2007/124333 A2 | 11/2007 |
| WO | 2015/007948 A1 | 1/2015 |

OTHER PUBLICATIONS

"CapSense Controllers", Cypress Performs, Retrieved on Jan. 29, 2015, Webpage available at : http://www.cypress.com/capsense/?source=CY-ENG-HEADER.

"Touchscreen Controllers", ST Life. Augmented, Retrieved on Jan. 29, 2015, Webpage available at : http://www.st.com/web/catalog/sense_power/FM89/SC1717.

Yao et al., "The Effect of Ambient Humidity on the ElectricalProperties of Graphene Oxide Films", Nanoscale Research Letters, Jul. 2, 2012, pp. 1-7.

Guo et al., "Two-Beam-Laser Interference Mediated Reduction, Patterning and Nanostructuring of Graphene Oxide for the Production of a Flexible Humidity Sensing Device", Carbon, vol. 50, Apr. 2012, pp. 1667-1673.

Yao et al., "Humidity Sensing Behaviors of Graphene Oxide-Silicon Bi-Layer Flexible Structure", Sensors and Actuators B: Chemical, vol. 161, Jan. 2012, pp. 1053-1058.

Trung et al., "Flexible and Transparent Nanocomposite of Reduced Graphene Oxide and P(VDF-TrFE) Copolymer for High Thermal Responsivity in a Field-Effect Transistor", Advanced Functional Materials, 2014, pp. 1-8.

Search Report received for corresponding United Kingdom Patent Application No. 1400013.7, dated Jun. 25, 2014, 5 pages.

Yuji et al., "Temperature and Humidity Sensing Functions of a Capacitive Touch Sensor for Material Discrimination", SICE 2004 Annual Conference, vol. 3, Aug. 4-6, 2004, pp. 2652-2655.

* cited by examiner

APPARATUS AND/OR METHOD FOR SENSING TOUCH INPUT

TECHNOLOGICAL FIELD

Embodiments of the present invention relate to an apparatus and/or method for sensing touch input.

BACKGROUND

It is now common in electronic apparatus such as mobile cellular telephones, for a user to provide user commands to the apparatus via touch input. A touch input in this sense may involve the user actually touching the device or putting their finger or input device in close proximity to the apparatus.

It is possible to detect a touch input, for example, by measuring a capacitance at a capacitive sensor electrode. The presence of a user input device such as a finger changes the capacitance of the capacitive sensor electrode and this changed capacitance may be measured. In order to provide a high resolution of touch input detection over a touch area, it may be necessary to provide a large number of capacitive sensor electrodes in the touch area. Control circuitry also needs to be provided for measuring the capacitance at the capacitive sensor electrode.

BRIEF SUMMARY

According to various, but not necessarily all, embodiments of the invention there is provided an apparatus comprising: a capacitive sensor electrode; and material configured to temporarily modify a capacitance of the capacitive sensor electrode during a period after a touch input has occurred.

According to various, but not necessarily all, embodiments of the invention there is provided a controller comprising: a threshold detector configured to detect when a capacitance of a capacitive sensor electrode triggers a first threshold or a second different threshold.

According to various, but not necessarily all, embodiments of the invention there is provided a method comprising detecting when a capacitance of a capacitive sensor electrode triggers a first threshold or a second different threshold.

BRIEF DESCRIPTION

For a better understanding of various examples that are useful for understanding the brief description, reference will now be made by way of example only to the accompanying drawings in which.

DETAILED DESCRIPTION

Figure 1:
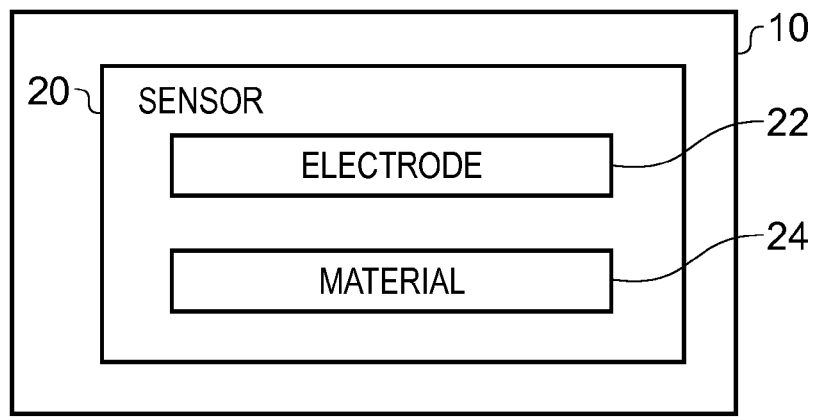
FIG. 1 illustrates an example of an apparatus comprising material configured to modify temporarily a capacitance of a capacitive sensor electrode during a period after a touch input has occurred.

FIG. 1 illustrates an example of an apparatus 10 comprising: at least one capacitive sensor electrode 22; and material 24 configured to modify temporarily a capacitance of the capacitive sensor electrode 22 during a period after a touch input has occurred.

The consequences of modifying the capacitance of the capacitive sensor electrode 22 may, for example, be detected as a mutual capacitance or a self capacitance of the capacitive sensor electrode 22.

Figure 2:
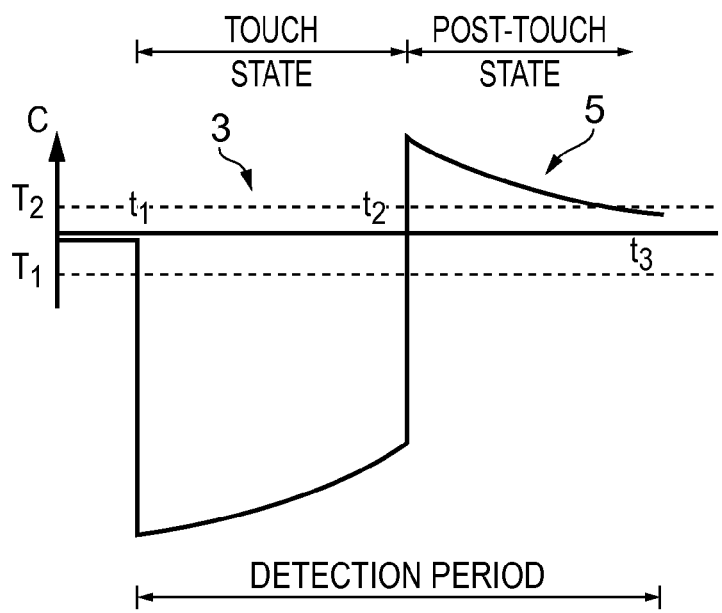
FIG. 2 illustrates an example of a capacitance response for the apparatus illustrated in FIG. 1.

FIG. 2 illustrates an example of how a capacitance measured at the capacitive sensor electrode 22 may change during a touch input period and also in the period after a touch input has occurred. The capacitance may be measured as a mutual capacitance or a self capacitance, however the figure illustrates measurement as a mutual capacitance.

In this figure, a touch input starts at time $t_1$ and continues until time $t_2$. During the touch input period between $t_1$ and $t_2$, a user input device such as a finger is in contact with or in close proximity to the apparatus 10. At time $t_2$, the user input device is removed from touching the apparatus or from being in close proximity to the apparatus 10. The material 24 is configured to temporarily modify the capacitance of the capacitive sensor electrode 22 during the period after the touch input has occurred, that is, after the time $t_2$.

During the touch input period 3 between time $t_1$ and time $t_2$, the material 24 may have a touch state in which an electrical characteristic of the material 24 changes in a first sense.

Referring to FIG. 2, during this period the electrical conductivity of the material 24 and its associated capacitance increases during the touch state. This is illustrated in the figure. At time $t_1$, when the touch input is initiated there is a sudden and large change in the capacitance measured at the capacitive sensor electrode 22. This change is a decrease if measured as a mutual capacitance from another electrode or an increase if measured as a self-capacitance. In this example, during the period of touch input 3 between times $t_1$ and $t_2$, the material 24 becomes increasingly conductive and the capacitance of the capacitive sensor electrode 22 rises.

At time $t_2$, the touch input ends and there is a rapid change in the capacitance measured at the capacitive sensor electrode 22. This change is an increase if measured as a mutual capacitance from another electrode or a decrease if measured as a self-capacitance. This is because the capacitive sensor electrode 22 has a fast response time. However, the response time of the material 24 is much slower and the change in the capacitance associated with the material 24 occurs gradually after the time $t_2$ when the touch input ends.

During the period 5 after the touch input has occurred, the material 24 may have a post-touch state in which the electrical characteristic of the material 24 changes in a second sense, opposite to the first sense. In this example, the electrical conductivity of the material 24 and its associated capacitance decreases during the post-touch state.

It will therefore be appreciated that the material 24 may be configured to have increased conductivity in response to a touch input and to maintain an increased level of conductivity during a time period 5 after the touch input has finished at time $t_2$.

It will be appreciated that, in the example of FIG. 2, when the touch input initially occurs, the capacitance measured at the capacitive sensor electrode 22 rapidly changes. Between times $t_1$ and $t_2$, while the touch input is occurring, the capacitance measured at the capacitive sensor electrode 22 increases. However, during the time that the touch input occurs between time $t_1$ and time $t_2$, the capacitance of the capacitive sensor electrode 22 passes a threshold value $T_1$.

The first threshold value $T_1$ may be used as a trigger value to identify the occurrence of the touch state. If the capacitance measured at the capacitive sensor electrode 22 is sensed to have passed the first threshold $T_1$, then it can be determined that a touch input is occurring.

At time $t_2$, when the touch input ends the capacitance measured at the capacitive sensor electrode 22 rapidly changes to a value that is greater than its value before the touch input started. This elevated capacitance value, slowly decreases over time and the capacitance measured at the capacitive sensor electrode 22 approaches its equilibrium value. It will be appreciated from the FIG. 2 that between time $t_2$ and time $t_3$ the capacitance measured at the capacitive sensor electrode 22 is greater than a second threshold $T_2$. The second threshold $T_2$ may be used to detect when the capacitance measured at the capacitive sensor electrode 22 has an elevated value which is indicative of the post-touch state.

As will be described later in this document, it is possible to control the rate of decrease of the capacitance of the material 24 after the touch input has occurred. Thus it is possible to control the duration between $t_2$ and $t_3$ during which the capacitance of the capacitive sensor electrode 22 is greater than the second threshold $T_2$.

Figure 3:
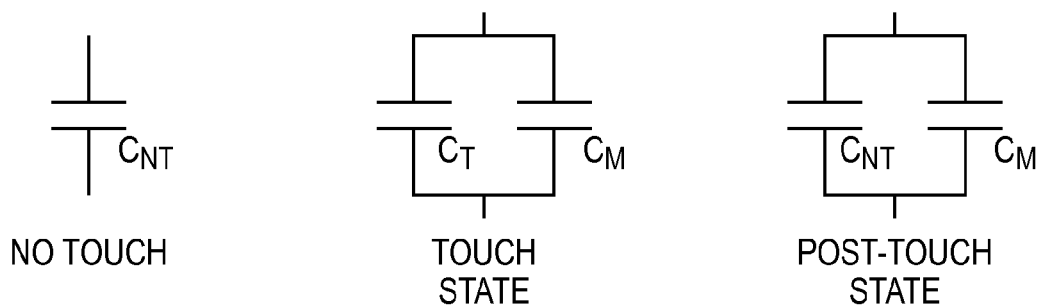
FIG. 3 is a schematic illustration of the different states of the apparatus illustrated in FIG. 1.

FIG. 3 is a schematic illustration of the different states of the apparatus 10. At the time before time $t_1$, the apparatus 10 is in a no touch state. The capacitance of the capacitive sensor electrode 22 has its equilibrium value $C_{NT}$. When a touch occurs, the apparatus 10 enters the touch state. In some embodiments, this may be modelled by a change in the capacitance of the capacitive sensor electrode 22 from the value $C_{NT}$ to the value $C_T$. At the same time, the capacitance of the material 24 may be modelled as a capacitance $C_M$ in parallel to the capacitance $C_T$. The capacitance $C_M$ may, in some examples, change its value during the time while the touch input is occurring. For example, in FIG. 2, the capacitance $C_M$ slowly increases during the touch state, however, other changes may be possible.

When the touch input ends, the apparatus 10 enters a post-touch state. The capacitance of the capacitive sensor electrode 22 rapidly changes from the value $C_T$ to its equilibrium value $C_{NT}$. However, the capacitance $C_M$ of the material 24 which is in parallel to the capacitance $C_{NT}$ is maintained for a period of time after the touch input has occurred. In some embodiments, for example as illustrated in FIG. 2, the value of the capacitance $C_M$ may vary after the touch input has occurred, however, it remains as a significant value at least until the time $t_3$.

The change in the capacitance of the capacitive sensor electrode 22 from the value $C_{NT}$ to the value $C_T$ may be detected to determine that a touch input is occurring. The change in capacitance associated with the capacitance $C_M$ of the material 24 in the post-touch state may be detected to determine that a touch input has recently occurred.

These changes may be detected as mutual capacitances or self capacitances.

It will therefore be appreciated that by detecting not only the touch state, but also by detecting the post-touch state, the period during which the capacitance can be sampled to detect a touch is extended from the period $t_1$ to $t_2$ to the period $t_1$ to $t_3$.

Figure 4:
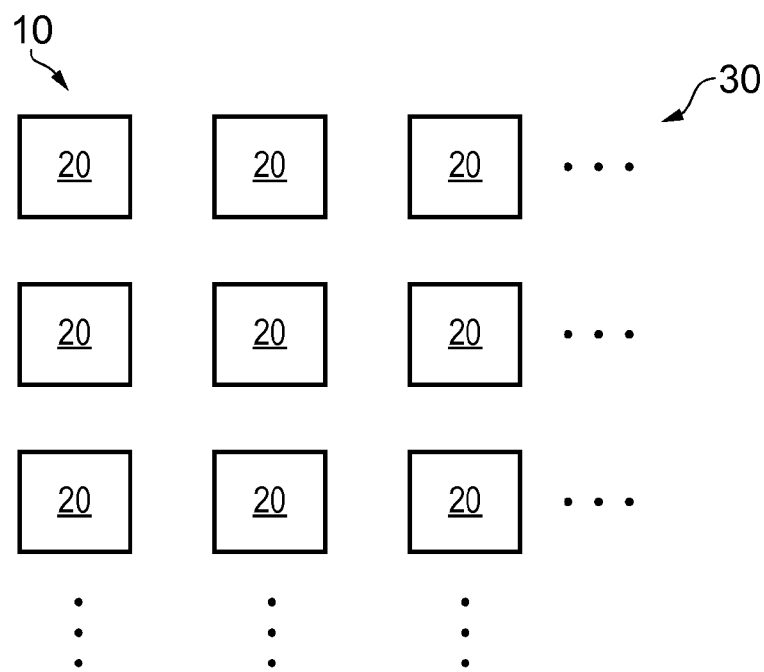
FIG. 4 illustrates an example of the apparatus, illustrated in FIG. 1, comprising a plurality of sensors arranged in an array.

FIG. 4 illustrates an example of the apparatus 10, as illustrated in FIG. 1, comprising a plurality of sensors 20 arranged in an array 30. Each sensor comprises: a capacitive sensor electrode 22 and material 24 configured to temporarily modify the capacitance of the capacitive sensor electrode 22 during a period after a touch input has occurred at the sensor 20.

In this example, the sensors 20 are arranged in rows and columns. The rows are equally spaced and the columns are equally spaced to form a regular array.

In some embodiments, each of the sensors 20 in the array 30 is the same. That is, each of the sensors 20 has the same capacitance response, for example as illustrated in FIG. 2.

Figure 6A:
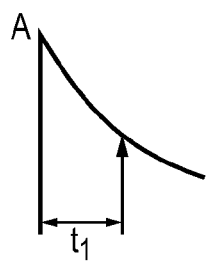
FIGS. 6A and 6B illustrate different capacitive responses for different sensors.
Figure 6B:
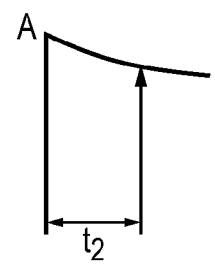

In other examples, different ones of the sensors 20 in the array 30 may be configured to respond differently to touch input. For example, the capacitance responses of the sensors 20 may be different. In particular, the capacitance response of the material 24 may be engineered so that it is different in different sensors 20. As a consequence, different sensors 20 have different values for $t_3$. This is illustrated in FIGS. 6A and 6B. In FIG. 6A, the material 24 has a fast relaxation (rate of change of capacitance) and the value of $t_3$ is small. In FIG. 6B, the relaxation time is longer and the value of $t_3$ is greater.

Figure 5:
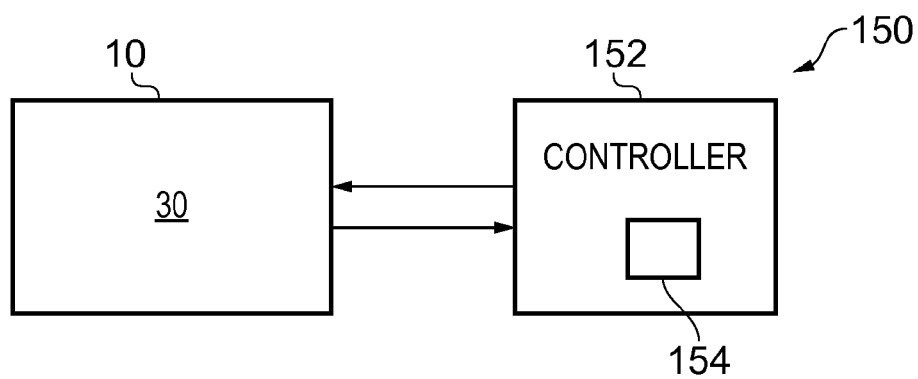
FIG. 5 illustrates an example of a system comprising an apparatus for example as illustrated in FIG. 1 or 4 and control circuitry.

FIG. 5 illustrates an example of a system 150 comprising the apparatus 10. In this example, the apparatus 10 comprises the array 30 of the sensors 20. The system 150 also comprises a controller 152 which is used to control the sensors 20 and to detect the occurrence of a touch input at any one or more of the sensors 20.

The controller 152 may comprise a threshold detector 154 configured to detect when a capacitance of any one of the sensors 20 of the array 30 triggers a first threshold $T_1$ or a second different threshold $T_2$. This occurs when a measurement of the capacitance of a sensor 20 has passed a first threshold $T_1$ or passed a second different threshold $T_2$. These thresholds may be the same for all the sensors or they may be particular to a particular sensor.

In some, but not necessarily all examples, the controller 152 may measure capacitance at the sensors 20 as a mutual capacitance. That is, the controller 152 may measure changes in capacitance relative to or using other sensor(s) or electrode(s).

In some, but not necessarily all examples, the controller 152 may measure capacitance of the sensors 20 independently as an absolute or self capacitance. That is, the controller 152 may measure a capacitance of a sensor relative to ground.

The threshold detector 154 is configured to detect when a capacitance measured at a capacitive sensor electrode 22 triggers a first threshold $T_1$ to determine a touch state and is configured to detect when the capacitance measured at the capacitive sensor electrode 22 triggers a second threshold $T_2$ to detect a post-touch state.

Referring back to the example of FIG. 2, in this example the first threshold $T_1$ would be less than the second threshold $T_2$. The first threshold $T_1$ is triggered when the mutual capacitance measured at the capacitive sensor electrode 22 is less than the first threshold $T_1$. The second threshold $T_2$ is triggered when the mutual capacitance measured at the capacitive sensor electrode 22 is greater than the second threshold $T_2$.

In some but not necessarily all embodiments, the controller 152 may be configured to switch between a first mode of operation and a second mode of operation. In the first mode of operation the controller 152 is configured to detect when the capacitance measured at the capacitive sensor electrode 22 triggers a first threshold $T_1$ but it does not detect when the capacitance measured at the capacitive sensor electrode 22 triggers the second threshold $T_2$. This mode is suitable for use when the duration of a touch input is likely to be long in relation to the sampling period the controller 152 uses to measure the capacitance at the capacitive sensor electrode 22.

In the second mode, the controller 152 is configured to detect when the capacitance measured at the capacitive sensor electrode 22 triggers the first threshold $T_1$ or the second threshold $T_2$. The second mode is suitable for use when the period of the actual touch input (touch state) is short compared to the sampling period the controller 152 uses to measure the capacitance at the capacitive sensor electrode 22.

It will be appreciated by those skilled in the art that the first mode corresponds to the "standard" mode of a currently existing controller for an array of capacitive touch sensors. The second mode of operation is, however, a new mode of operation. It is particularly suitable for use when the period between sampling used by the controller 152 is long compared to the duration of the actual touch input (touch state). This may occur when particularly large arrays of sensors 20 are used. It may also occur when the touch input is a particularly rapid form of input such as handwriting or some other graphic symbol.

It will therefore be appreciated that the second mode of operation is particularly suitable for handwriting recognition and written or graphic forms of authentication.

In some but not necessarily all embodiments, the controller 152 may be configured to estimate a speed of touch input. That is, it may be possible to estimate how quickly the touch input moves between one sensor 20 and an adjacent sensor 20.

As previously mentioned, the capacitance of the material 24 may relax after the end of the touch input during the post-touch state. This relaxation is illustrated in FIG. 6A. If the relaxation can be accurately modelled, it may be possible to use the capacitance measured at the capacitive sensor electrode 22 during the post-touch state to determine how much time has elapsed since the post-touch state has entered. In some embodiments, this may be problematic because the initial value of the capacitance on entering the post-touch state may be dependent upon the duration of the touch state, or other arbitrary parameters.

However, in some embodiments it may be possible to have different sensors 20 with different relaxation characteristics. For example, as illustrated in FIG. 6B, a touch sensor 20 has a different relaxation characteristic to that illustrated in FIG. 6A. If it is assumed that the relaxation characteristic of FIG. 6A relates to a first sensor 20 and the relaxation characteristic of FIG. 6B relates to an adjacent second sensor 20, then if it is assumed that the capacitance value at both of the first and second sensors 20 is initially the same after the touch state, then by measuring the capacitance at one of the first sensor 20 and the capacitance at the second sensor 20, it may be possible to estimate a difference between the durations of the post-touch state at each of the first and second sensors 20. The difference in the duration of the post-touch state for each of the adjacent first and second sensors 20 is indicative of the time taken for the touch input to travel between the two sensors 20. As a consequence, the controller 152 may be able to estimate the speed of movement of the touch input.

The elevated capacitance value at a sensor 20 immediately after a touch state depends upon the electrical characteristic of the material 24 and how it changes in response to a touch and may also depend upon the characteristics of the touch. In some but not necessarily all examples, the characteristics of the touch may dependent upon, for example, the stimulus the touch provides to the material 24 and the period of time over which the stimulus is provided. This elevated capacitance value, and the relaxation of the material 24 determines the time $t_3$-$t_2$ taken for the elevated capacitance value to reach the second threshold $T_2$. The assumption that the elevated capacitance value at both of the first and second sensors 20 is initially the same after the touch state, is a reasonable assumption when the characteristics of the touch (stimulus and duration) is the same at both the first and second sensors 20.

Figure 7:
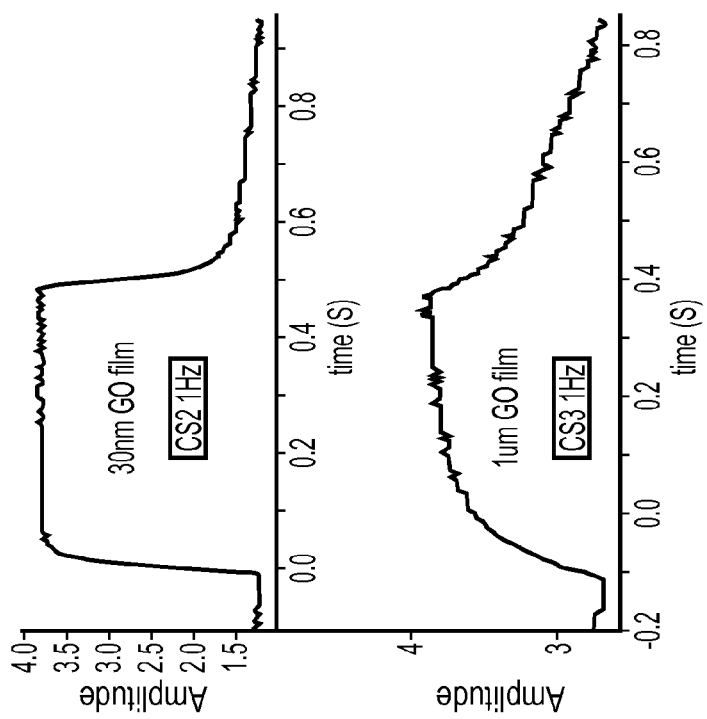
FIG. 7 illustrates different capacitive responses for different sensors.

The relaxation characteristics of the material 24 may be engineered, for example, by varying the thickness of the material 24 as illustrated in FIG. 7. FIG. 7 illustrates that for a particular material 24, the relaxation of the capacitance of the material 24 is much slower than for a thinner section of material 24 than for a thicker section of material 24.

Figure 8:
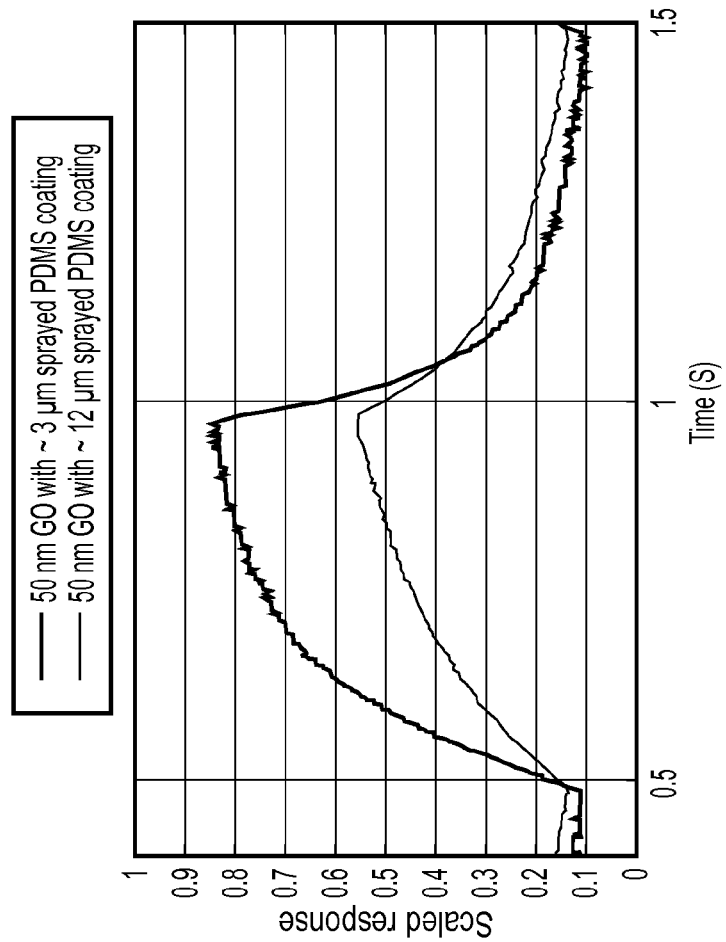
FIG. 8 illustrates different capacitive responses for different sensors.

FIG. 8 illustrates that it may be possible to add additional material to the apparatus 10 that varies the relaxation characteristic of the material 24.

In some but not necessarily all embodiments, the material 24 may be or comprise graphene oxide (GO). The conductivity of graphene oxide is sensitive to humidity. When a user traces a digit over the apparatus 10, the humidity from the user's digit changes the electrical characteristics of the graphene oxide. As the graphene oxide absorbs the humidity, its electrical conductivity increases. When the digit is removed, the humidity evaporates and the electrical conductivity of the graphene oxide decreases.

The lower figure in FIG. 7 illustrates the response of graphene oxide to humidity when it is a layer 1 μm thick. The upper figure in FIG. 7 illustrates the response of graphene oxide to humidity when it is 30 nm thick.

FIG. 8 illustrates how the response of graphene oxide to humidity may be controlled by spray coating the apparatus 10 with polydimethylsiloxane (PDMS) or some other permeable or semi-permeable coating. The relaxation of the material 24 becomes greater with the thickness of the coating. That is, it takes longer for the humidity to reach the graphene oxide 24 and it also takes longer for the humidity having reached the graphene oxide 24 to evaporate. This therefore results in a slower response both to the presence of a touch input and also the removal of the touch input.

The elevated capacitance value at a sensor 20, which uses graphene oxide as material 22, immediately after a touch state depends upon the electrical characteristic of the graphene oxide 24 and how it changes in response to a touch and also upon the amount of moisture (stimulus) provided by the touch. The amount of moisture is a function of the moisture level of a user's digit and the duration of the touch.

Other materials may be used for material 24. For example, in some but not necessarily all embodiments, the material 24 may be or comprise polyaniline. The conductivity of polyaniline is sensitive to humidity.

Other materials may be used for material 24. For example, in some but not necessarily all embodiments, the material 24 may comprise functional groups such as hydroxyl, epoxy, carboxyl groups that can provide hydrogen atoms (protons) in the presence of water. This decreases an electrical resistance of the material 24 in the presence of water vapour (humidity).

Figure 9:
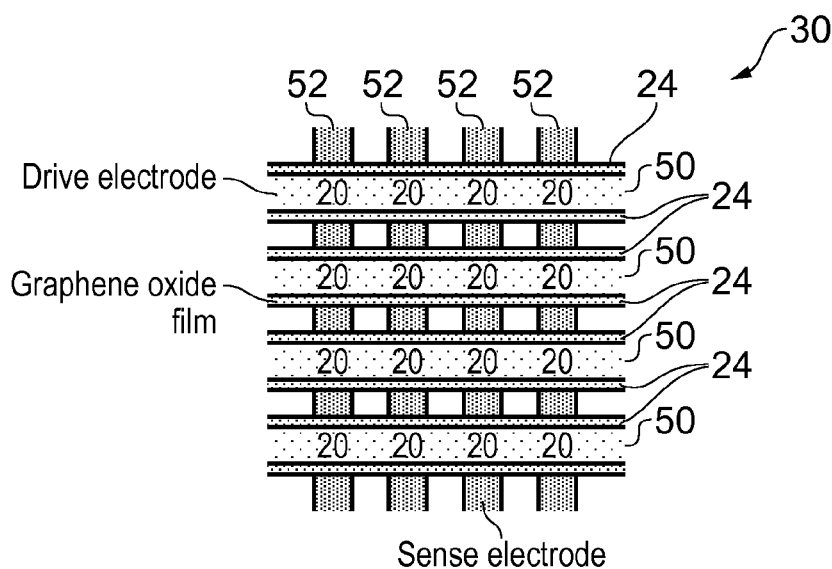
FIG. 9 illustrates an example of an array of sensors.

FIG. 9 illustrates an example of a configuration of an array 30 of sensors 20. In this example a plurality of sense electrodes 52 are arranged in parallel columns. A plurality of drive electrodes 50 are arranged in parallel rows. Where the sense electrodes 52 and drive electrodes 50 overlap, a sensor 20 is formed.

In this example, the drive electrodes 50 are augmented using graphene oxide film 24. The graphene oxide 24 is configured to temporarily modify a capacitance of the drive electrode 50 during a period after a touch input has occurred.

In this example, the graphene oxide film 24 is used to extend the width of the drive electrodes 50. The graphene oxide 24 extends down both sides of each drive electrode 50, as parallel strips that contact the drive electrode 50.

In this example the graphene oxide 24 is located adjacent and in contact with the drive electrodes 50 only. However, in other embodiments the graphene oxide 24 may be located, alternatively or additionally, adjacent and in contact with the sense electrodes 52.

The operation of the array 30 illustrated in FIG. 9 will now be described with reference to FIGS. 10A, 10B, 10C and 10D.

These figures illustrate a cross-section through a sensor 20 of the array 30 in FIG. 9. The sense electrodes 52 occupy a lower second layer $L_2$. The drive electrodes 50 occupy a first layer $L_1$. A dielectric material separates the drive electrodes 50 and the sense electrodes 52.

The drive electrode 50 is connected to the graphene oxide 24 at its lateral edges.

Figure 10A:
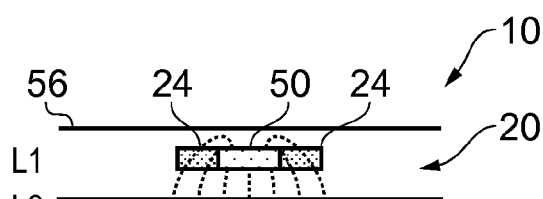
FIGS. 10A, 10B, 10C and 10D illustrate cross-sections through a sensor during different states of the apparatus.

FIG. 10A illustrates the situation before a user touches a touch surface 56 of the apparatus 10. This corresponds to the period before $t_1$ in FIG. 2. The graphene oxide film 24 has a low electrical conductivity. It is therefore transparent to the electric field lines produced by the drive electrode 50 and terminating on the sense electrode 52.

Figure 10B:
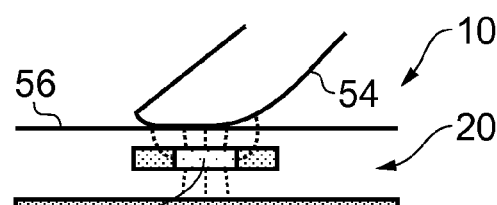

FIG. 10B illustrates the situation when a user's digit 54 touches the touch surface 56. Initially there is a large change in the capacitance associated with the drive electrode 50. The electric field lines produced by the drive electrode 50 are terminated not only at the sense electrode 52 but now also at the user's digit 54.

The reduced electric field at the sense electrode 52 corresponds to a reduction in mutual capacitance. This reduction in mutual capacitance is very rapid and corresponds to the situation at or just after time $t_1$ in FIG. 2.

Figure 10C:
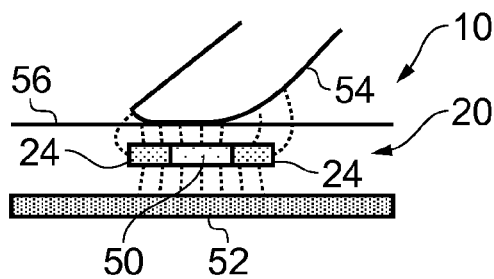

While the user digit 54 is in contact with the touch surface 56, moisture from the digit 54 transfers from the digit 54 to the graphene oxide 24. The conductivity of the graphene oxide 24 increases with the amount of moisture that reaches it. As the amount of moisture reaching the graphene oxide 24 increases over time, the electrical conductivity of the graphene oxide 24 also increases over time. Therefore the conductivity of the graphene oxide 24 increases over time. As the conductivity of the graphene oxide 24 increases it operates to extend the effective area of the drive electrode 20, as illustrated in FIG. 10C. This increases the capacitance sensed at the sense electrode 52. Therefore while the digit 54 is in contact with the touch surface 56 and humidity is transferred to the graphene oxide 24, the mutual capacitance sensed at the sense electrode 52 gradually increases. This corresponds to the time period between times $t_1$ and $t_2$ in FIG. 2.

Figure 10D:
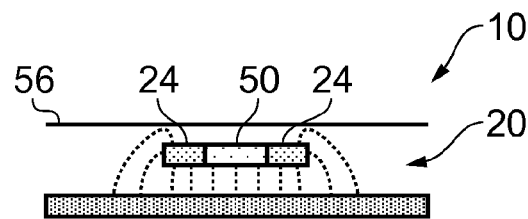

FIG. 10D illustrates the situation immediately after the digit 54 has been removed from the touch surface 56. At this time, there is still significant humidity in the region of the graphene oxide 24 and its electrical conductivity is therefore relatively high. It is therefore operationally extending the area of the drive electrode 50. As the user's digit 54 has been removed, all of the electric field lines generated by the drive electrode 50 are terminated at the sense electrode 52. Therefore comparing FIGS. 10A and 10D, the mutual capacitance sensed at the sense electrode 52 is greater in FIG. 10D than in FIG. 10A because the effective area of the drive electrode 50 is greater in FIG. 10D. Therefore the mutual capacitance sensed at the sense electrode 52 is at an elevated value. This corresponds to the time period time $t_2$ in FIG. 2.

As the water vapour evaporates from the graphene oxide 24 its conductivity decreases and the effective area of the drive electrode 50 decreases. This results in a decrease in the measured mutual capacitance at the sense electrode 52. This corresponds to the time period between times $t_2$ and $t_3$ in FIG. 2.

As previously described, it is possible to engineer the response of the sensor 20 to humidity from the digit 54. For example, it is possible to change the thickness of the graphene oxide film 24. It is also possible to apply water-permeable layers at the touch surface 56 and/or hydrophilic material.

Figure 11:
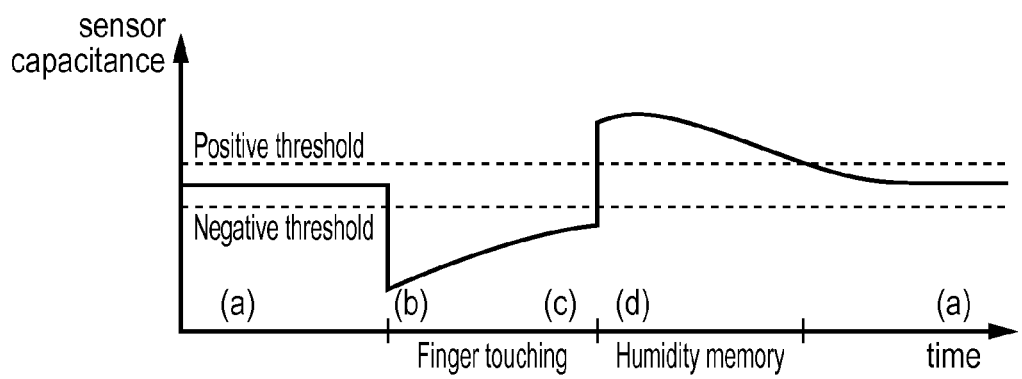
FIG. 11 illustrates an alternative capacitive response of an apparatus, for example, as illustrated in FIG. 1, 4, 9 or 10A to 10D.

It should be appreciated that the response of the sensor illustrated in FIG. 2 is only a schematic. FIG. 11 illustrates an alternative response.

Implementation of the controller 152, in FIG. 5, can be in hardware alone (a circuit, a processor), have certain aspects in software including firmware alone or can be a combination of hardware and software (including firmware).

The controller 152 may be implemented using instructions that enable hardware functionality, for example, by using executable computer program instructions in a general-purpose or special-purpose processor that may be stored on a computer readable storage medium (disk, memory etc) to be executed by such a processor.

References to 'computer-readable storage medium', 'computer program product', 'tangibly embodied computer program' etc. or a 'controller', 'computer', 'processor' etc. should be understood to encompass not only computers having different architectures such as single /multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device."

It will also be appreciated that the capacitance of the material provides a memory. The memory is written to by a user's touch and is read by the detector 152 even after the user's touch has finished.

As used here 'module' refers to a unit or apparatus that excludes certain parts/components that would be added by an end manufacturer or a user. The apparatus 10 may be a module. For example the apparatus 10 may be a touch panel or a touch screen display. Alternatively the apparatus 10 may be a product such as a mobile cellular telephone, a personal electronic device, a computer, an automobile or other vehicle, a visual display, a point of sale terminal or any other apparatus that detects touch input.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a capacitive sensor electrode; and
material configured to temporarily modify a capacitance of the capacitive sensor electrode during a period after a touch input has occurred, wherein after the touch input has occurred, a material change in capacitance of the material is relatively slower than an electrode change in capacitance of the capacitive sensor electrode so that a period during which the capacitance can be sampled to detect the touch input is extended.

2. An apparatus as claimed in claim 1, wherein the material has a touch state during a touch input in which an electrical characteristic of the material changes in a first sense and the material has a post-touch state, during the period after the touch input has occurred, in which the electrical characteristic of the material changes in a second sense, opposite to the first sense.

3. An apparatus as claimed in claim 2, wherein the electrical conductivity of the material increases during the touch state and wherein the electrical conductivity of the material decreases during the post-touch state.

4. An apparatus as claimed in claim 1, wherein the material is configured to have increased conductivity in response to a touch input and to maintain increased conductivity during a period after the touch input has finished.

5. An apparatus as claimed in claim 1, wherein a capacitance of the capacitive sensor electrode passes a first threshold during a touch state and wherein the capacitance of the capacitive sensor electrode passes a second threshold during a post-touch state.

6. An apparatus as claimed in claim 5, wherein the capacitance of the capacitive sensor electrode is past the second threshold during the post-touch state for at least a predetermined time.

7. An apparatus as claimed in claim 1, wherein the material is configured to extend the capacitive sensor electrode.

8. An apparatus as claimed in any claim 1, wherein a sensor comprises the capacitive sensor electrode and an additional capacitive sensor electrode, wherein one of the capacitive sensor electrode and the additional capacitive sensor electrode is configured to operate as a driver electrode and wherein the other of the capacitive sensor electrode and the additional capacitive sensor electrode is configured to operate as a receiver electrode.

9. An apparatus as claimed in claim 8, wherein the driver electrode is configured to be extended by the material.

10. An apparatus as claimed in claims 8, wherein the receiver electrode is extended by the material.

11. An apparatus as claimed in claim 1 comprising a plurality of sensors arranged in a regular array wherein each sensor comprises:
a capacitive sensor electrode; and
material configured to temporarily modify a capacitance of the capacitive sensor electrode during a period after a touch input has occurred at the sensor.

12. An apparatus as claimed in claim 11, wherein each of the sensors in the regular array is the same.

13. An apparatus as claimed in claim 11, wherein different ones of the sensors in the array are configured to respond differently to touch input.

14. An apparatus as claimed in claim 1, wherein the material is configured to temporarily modify a capacitance of the capacitive sensor electrode in response to a humidity change caused by touch input.

15. An apparatus as claimed in claim 14, further comprising a cover layer extending over the material, wherein the cover layer is water-permeable.

16. An apparatus as claimed in claim 15, wherein the cover layer comprises hydrophilic material.

17. An apparatus as claimed in claim 1, wherein the material is graphene oxide.

18. An apparatus as claimed in claim 1, further comprising a controller wherein the controller is configured to detect when a capacitance of a capacitive sensor electrode triggers a first threshold to determine a touch state and wherein the controller is configured to detect when the capacitance of the capacitive sensor electrode triggers a second threshold to detect a post-touch state.

19. An apparatus as claimed in claim 1 wherein a controller is configured to switch between a first mode of operation in which the controller is configured to detect when the capacitance of the capacitive sensor electrode triggers a first threshold to determine a touch state but is not configured to detect when the capacitance of the capacitive sensor electrode triggers the second threshold and a second mode of operation in which the controller is configured to detect when the capacitance of the capacitive sensor electrode triggers the first threshold or second threshold to detect an input state.

20. An apparatus as claimed in claim 1, wherein a controller is configured to estimate a speed of touch input.

* * * * *